(12) United States Patent
Tada et al.

(10) Patent No.: US 8,679,284 B2
(45) Date of Patent: Mar. 25, 2014

(54) SKIN ADHESION APPARATUS AND ADHESION METHOD THEREOF

(75) Inventors: Masao Tada, Aichi (JP); Shinichi Takahashi, Aichi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 1194 days.

(21) Appl. No.: 12/018,389

(22) Filed: Jan. 23, 2008

(65) Prior Publication Data
US 2008/0178996 A1    Jul. 31, 2008

(30) Foreign Application Priority Data
Jan. 31, 2007 (JP) .................................. 2007-021901

(51) Int. Cl.
*B32B 37/10* (2006.01)
(52) U.S. Cl.
USPC .............. 156/285; 156/64; 156/286; 156/356; 156/358
(58) Field of Classification Search
USPC ........... 156/381, 64, 285–287, 349, 356, 358, 156/382; 100/269.02, 269.01, 269.03, 100/269.04; 425/389, 269.01, 269.03, 425/269.04
See application file for complete search history.

(56) References Cited

U.S. PATENT DOCUMENTS

| | | | |
|---|---|---|---|
| 4,334,850 A * | 6/1982 | Garabedian | 425/388 |
| 4,350,545 A * | 9/1982 | Garabedian | 156/87 |
| 4,441,956 A | 4/1984 | Kiss | |
| 4,447,201 A * | 5/1984 | Knudsen | 425/397 |
| 5,139,604 A | 8/1992 | Mitchell | |
| 5,318,647 A | 6/1994 | Mitchell | |

FOREIGN PATENT DOCUMENTS

| | | |
|---|---|---|
| DE | 3008486 | 9/1981 |
| EP | 1531036 | 5/2005 |
| FR | 2509225 | 1/1983 |
| JP | 52-78278 | 7/1977 |
| JP | 1-195021 | 8/1989 |
| JP | 3-52137 U | 5/1991 |
| JP | 11-105120 | 4/1999 |

OTHER PUBLICATIONS

English language Abstract of JP 11-105120.
English language Abstract of JP 1-195021.

* cited by examiner

*Primary Examiner* — Christopher Schatz
(74) *Attorney, Agent, or Firm* — Greenblum & Bernstein, P.L.C.

(57) ABSTRACT

A skin adhesion apparatus includes an upper mold half and a lower mold half. The upper mold half and the lower mold half clamps a core material and a skin laid on the core material so that the skin is adhered to a surface of the core material. Disposed along a mold surface of the upper mold half is a tubular member made of elastic material. The skin adhesion apparatus also includes a pump for supplying fluid into the tubular member. When adhering the skin to the core material, the upper mold half is pulled down and then stopped at a predetermined distance above the core material. After then, fluid is supplied into the tubular member so that the fluid pressure inflates the tubular member.

4 Claims, 6 Drawing Sheets

SKIN ADHESION APPARATUS AND ADHESION METHOD THEREOF

CROSS REFERENCE TO RELATED APPLICATION

This application claims priority from Japanese Patent Application No. 2007-021901 filed Jan. 31, 2007. The entire content of this priority application is incorporated herein by reference.

BACKGROUND OF THE INVENTION

1. Field of the Invention

The present invention relates to a skin adhesion apparatus and a skin adhesion method.

2. Description of the Related Art

A known apparatus for adhering a skin onto a surface of a core material is shown in FIG. 6.

An adhesion apparatus 100 as shown in FIG. 6 includes an upper mold half 102 and a lower mold half 104. The upper mold half 102 and the lower mold half 104 is arranged to clamp the core material 106 and the skin 108 laid on the core material 106 so that the skin 108 is adhered to a surface of the core material 106.

With the skin adhesion apparatus 100, first, a core material 106 is set on the lower mold half 104. Next, adhesive 107 is applied to an upper surface of the core material 106 or a lower surface of the skin 108. Next, the skin 108 is placed on the upper surface of the core material 106. Next, the upper mold half 102 is pulled down so that the core material 106 and the skin 108 are clamped between the upper mold half 102 and the lower mold half 104. Thus, the skin 108 is pressed against the surface of the core material 106 and firmly adhered thereto.

With the skin adhesion apparatus 100, however, the shape of a mold surface 102*a* of the upper mold half 102 is necessary to exactly fit the surface shape of the core material 106. Accordingly, the shape of the mold surface 102*a* of the upper mold half 102 have to be changed in every case where any slight change is made in the surface shape of the core material 106. Accordingly, it is a problem that much cost is required when changing the shape of the core material 106.

Also with the skin adhesion apparatus 100 as shown in FIG. 6, when the upper mold half 102 is pulled down, a horizontal portion 102*a*1 of the mold surface 102*a* moves perpendicularly with respect to a corresponding portion of the skin 108, and therefore the horizontal portion 102*a*1 can evenly press the corresponding portion of the skin 108. A vertical portion 102*a*2 of the mold surface 102*a*, however, moves parallel with respect to a corresponding portion of the skin 108, and therefore the vertical portion 102*a*2 cannot evenly press the corresponding portion of the skin 108. Furthermore, it is also a problem that the vertical portion 102*a*2 rubs the surface of the corresponding portion of the skin 108, which exerts an undesirable influence for the appearance of the skin 108.

The other skin adhesion apparatuses are described in Japanese Patent Application Laid-Open Publication 11-105120 and Japanese Patent Application Laid-Open Publication 1-195021.

The skin adhesion apparatus disclosed in each of these publications has a film member made of elastic material such as rubber. The film member is arranged to be filled with fluid such as water, air, or the like, thereby pressing the skin against the core material with the fluid pressure.

When the film member disclosed in each of these publications is filled with fluid, however, the film member is seriously inflated downwardly at the central portion thereof. The portion inflated downwardly therefore causes a first contact with the skin. In this case, simultaneous application of the fluid pressure on the entire surface of the skin is impossible, and therefore it is difficult to evenly adhere the skin to the surface of the core material.

SUMMARY OF THE INVENTION

This invention has been completed based on the above situation, and its purpose is to provide a skin adhesion apparatus and a skin adhesion method that do not need any change in the shape of a mold surface of an upper mold half even in a case where a surface shape of a core material is slightly changed.

Another purpose of the present invention is to provide a skin adhesion apparatus and a skin adhesion method that can substantially simultaneously press an entire skin against a surface of a core material.

A first aspect of the present invention is a skin adhesion apparatus for adhering a skin to a surface of a core material that includes an upper mold half having a mold surface thereon and a lower mold half. The upper mold half and the lower mold half is capable of clamping the core material and the skin laid on the core material. The skin adhesion apparatus also includes at least one tubular member made of elastic material. The at least one tubular member is disposed along the mold surface of the upper mold half. The skin adhesion apparatus also includes a fluid supplier capable of supplying fluid into the tubular member.

In accordance with the first aspect of the present invention, a pressure of the supplied fluid in the at least one tubular member presses the skin against the surface of the core material. Since serious partial downward inflation associated with a film member is not caused in the tubular member, the entire skin can be substantially simultaneously pressed against the surface of the core material. This allows the skin to be evenly adhered to the surface of the core material and make a good appearance.

Also in accordance with the first aspect of the present invention, the tubular member made of elastic material has proper elasticity. Accordingly, even in a case where the surface shape of the core material is slightly changed, the tubular member can accept the shape of the mold surface of the core material only by elastically deforming itself, and it is unnecessary to change the shape of the mold surface of the upper mold half.

A second aspect of the present invention is the skin adhesion apparatus further including a temperature controller capable of controlling a temperature of the fluid to be supplied into the at least one tubular member.

In accordance with the second aspect of the present invention, the tubular member for pressing the skin can also serve for heating or cooling the skin and the core material. Therefore, the configuration of the whole apparatus can be more simplified than in a case where a heater (or cooler) for the skin and the core material is additionally installed, and therefore the whole apparatus can be manufactured at lower cost.

A third aspect of the present invention is the skin adhesion apparatus further including a pressure controller capable of controlling a pressure of the fluid to be supplied into the at least one tubular member.

In accordance with the third aspect of the present invention, the pressure for pressing the skin is controllable. Therefore, the pressure can be properly controlled in accordance with a shape of the core material, a type of the skin, a type of adhesive, or the like. This allows the skin to be more reliably adhered to the surface of the core material.

A fourth aspect of the present invention is the skin adhesion apparatus, wherein the at least one tubular member comprises a plurality of tubular members, and the plurality of tubular members are parallel-connected. The skin adhesion apparatus further includes at least one pressure controller. The at least one pressure controller is capable of controlling the pressures of the fluid to be supplied into the plurality of tubular members each separately.

In accordance with the fourth aspect of the invention, each of the pressures of the fluid to be supplied into the plurality of tubular members can be controlled separately. That is, each of the plurality of tubular members can be separately controlled in pressure when pressing the skin. Accordingly, at a portion where higher pressure for pressing the skin is required, the pressure of the fluid to be supplied to the corresponding one of the plurality of tubular members can be controlled to be higher; while, at a portion where higher pressure for pressing the skin is not required, the pressure of the fluid to be supplied to the corresponding one of the plurality of tubular members can be controlled to be lower. This allows the skin to be more reliably adhered to the surface of the core material.

A fifth aspect of the present invention is the skin adhesion apparatus, wherein the at least one tubular member is bent backward at a plurality of portions thereof.

In accordance with the fifth aspect of the invention, the tubular member disposed along the mold surface of the upper mold half can be configured by a single tubular member. Therefore, the configuration of the whole apparatus can be more simplified.

A sixth aspect of the present invention is the skin adhesion apparatus for adhering the skin to the surface of the core material, including an upper mold half having a mold surface thereon and a lower mold half. The upper mold half and the lower mold half are capable of clamping the core material and the skin laid on the core material. The skin adhesion apparatus also includes at least one tubular member made of elastic material. The at least one tubular member is disposed along the mold surface of the upper mold half. The skin adhesion apparatus also includes a fluid supplier for supplying fluid into the at least one tubular member, and a temperature controller for controlling a temperature of the fluid to be supplied into the at least one tubular member.

A seventh aspect of the present invention is a method for adhering a skin to a surface of a core material, the method including the steps of a) setting the core material on a lower mold half; b) placing the skin onto an upper surface of the core material; c) pulling down an upper mold half and then stopping the upper mold half at a predetermined distance above the core material; d) After step c), supplying fluid into at least one tubular member made of elastic material, the at least one tubular member being disposed along a mold surface of the upper mold half; e) inflating the at least one tubular member by a pressure of the fluid or maintaining the shape of the at least one tubular member inflated by the pressure of the fluid; and f) pressing the skin against the core material by the at least one tubular member.

In accordance with the seventh aspect of the present invention, the pressure of the supplied fluid in the tubular member can press the skin against the surface of the core material. Since serious partial downward inflation associated with the film member of each of the conventional arts is not caused in the tubular member, the entire skin can be pressed substantially simultaneously against the surface of the core material. This allows the skin to be evenly adhered to the surface of the core material to make a good appearance.

Also in accordance with the seventh aspect of the present invention, the tubular member made of elastic material has proper elasticity. Accordingly, the tubular member can, only by elastically deforming itself, accept a slight change made in the surface shape of the core material, without any change in the shape of the mold surface of the upper mold half.

Also in accordance with the seventh aspect of the present invention, the fluid is supplied into the tubular member after the upper mold half is pulled down and then stopped. Therefore, the weight of the upper mold half, the compressive stress generated during its downward movement of the upper mold half, and the like is not directly applied on the core material and the skin. Accordingly, the core material and the skin are free from any undesirable influence associated with the weight of the upper mold half and the compressive stress.

An eighth aspect of the present invention is the method for adhering the skin, the method further including a step of controlling a temperature of the fluid to be supplied into the at least one tubular member.

In accordance with the eighth aspect of the present invention, the tubular member for pressing the skin can also serve for heating (or cooling) the skin and the core material. Therefore, the configuration of the whole apparatus is more simplified than in a case where a heater or cooler for the skin and the core material is additionally installed, and therefore the whole apparatus can be manufactured at lower cost.

The ninth aspect of the present invention is the method for adhering the skin, the method further including a step of controlling the pressure of the fluid to be supplied into the at least one tubular member.

In accordance with the ninth aspect of the present invention, the pressure for pressing the skin is controllable. Therefore, the pressure can be properly controlled in accordance with a shape of the core material, a type of the skin, a type of adhesive, or the like. This allows the skin to be more reliably adhered to the surface of the core material.

A tenth aspect of the present invention is the method for adhering the skin, wherein the at least one tubular member comprises a plurality of tubular members, and the plurality of tubular members are parallel-connected. The method further includes a step of controlling the pressures of the fluid to be supplied into the plurality of tubular members each separately.

In accordance with the tenth aspect of the invention, each of the pressures of the fluid to be supplied into the plurality of tubular members can be controlled separately. Accordingly, at a portion where higher pressure for pressing the skin is necessary, the pressure of the fluid to be supplied to the corresponding one of the tubular members can be controlled to be higher, while, at a portion where higher pressure for pressing the skin is unnecessary, the pressure of the fluid to be supplied to the corresponding one of the tubular members can be controlled to be lower. This allows the skin to be more reliably adhered to the surface of the core material.

According to the present invention, the skin adhesion apparatus and the skin adhesion method that do not require any change in the shape of the mold surface of the upper mold half even in the case where the surface shape of the core material is slightly changed can be provided. Furthermore, the skin adhesion apparatus and the skin adhesion method that can press the entire skin substantially simultaneously against the surface of the core material can be provided.

DETAILED DESCRIPTION OF THE INVENTION

An embodiment in accordance with the present invention will be hereinafter described in details referring to figures.

Figure 1:
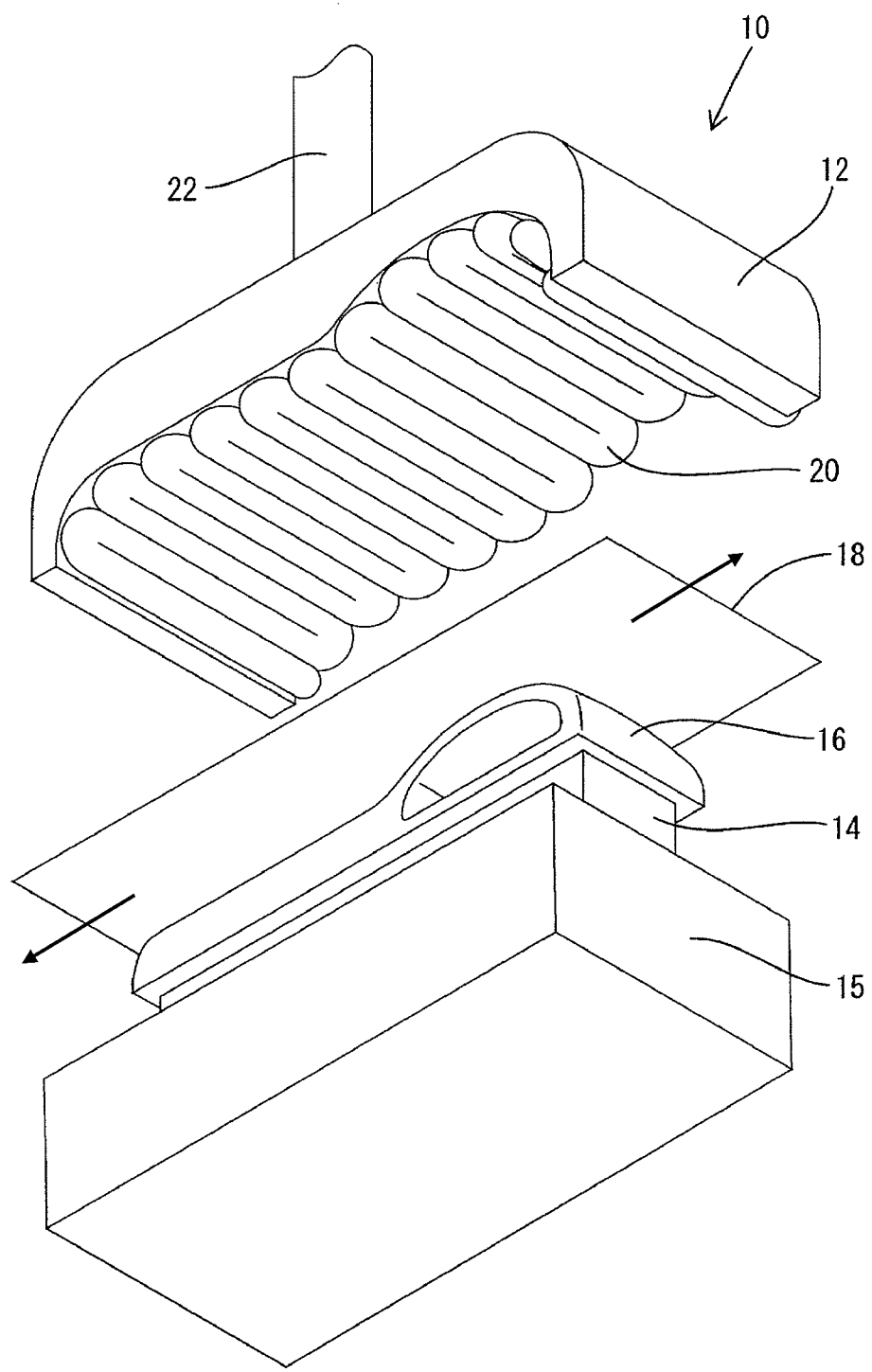
FIG. 1 is a perspective view of a skin adhesion apparatus.
Figure 2:
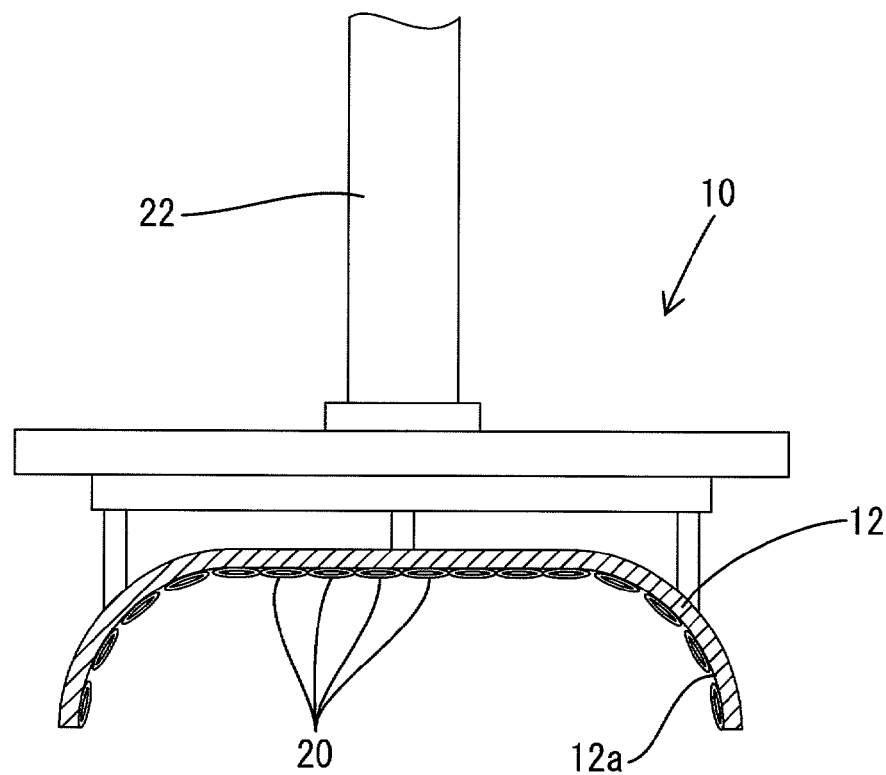
FIG. 2 is a cross-sectional view of the skin adhesion apparatus, showing a step in a process of adhering a skin to a core material.
Figure 2:
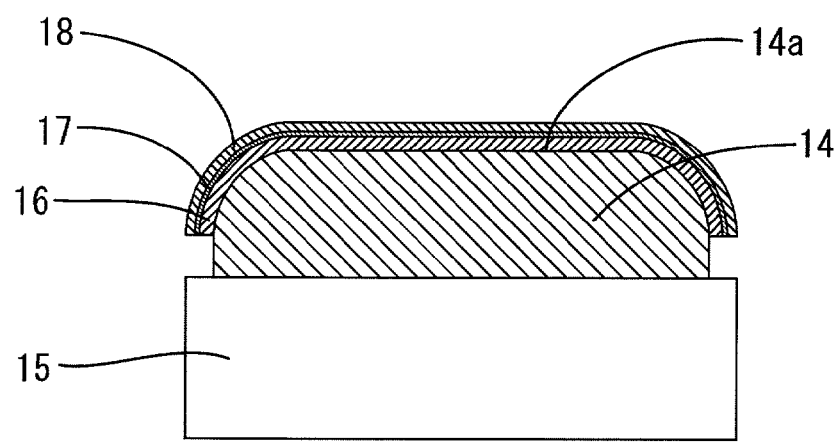
Figure 3:
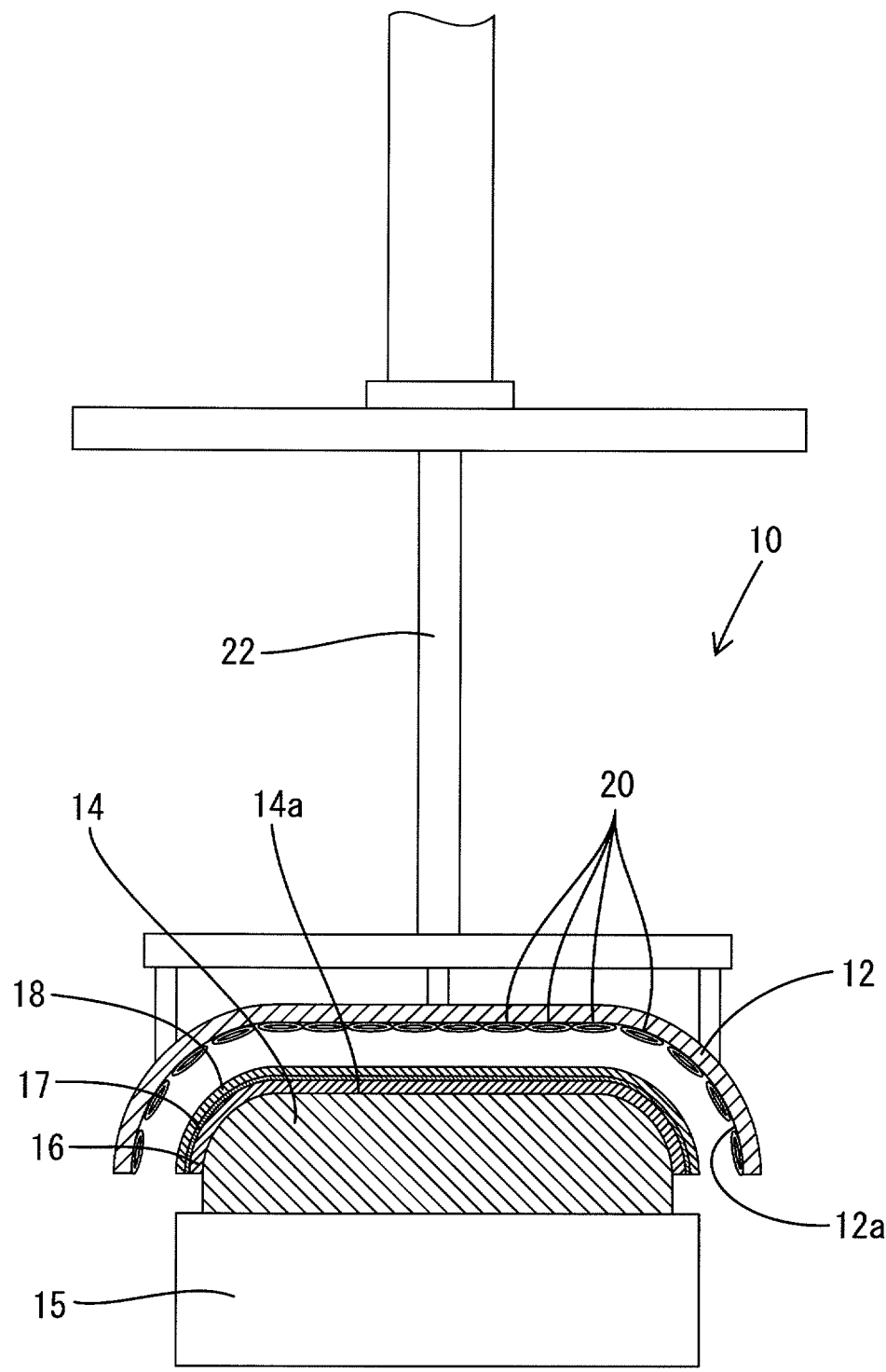
FIG. 3 is across-sectional view of the skin adhesion apparatus, showing another step in the process of adhering the skin to the core material.
Figure 4:
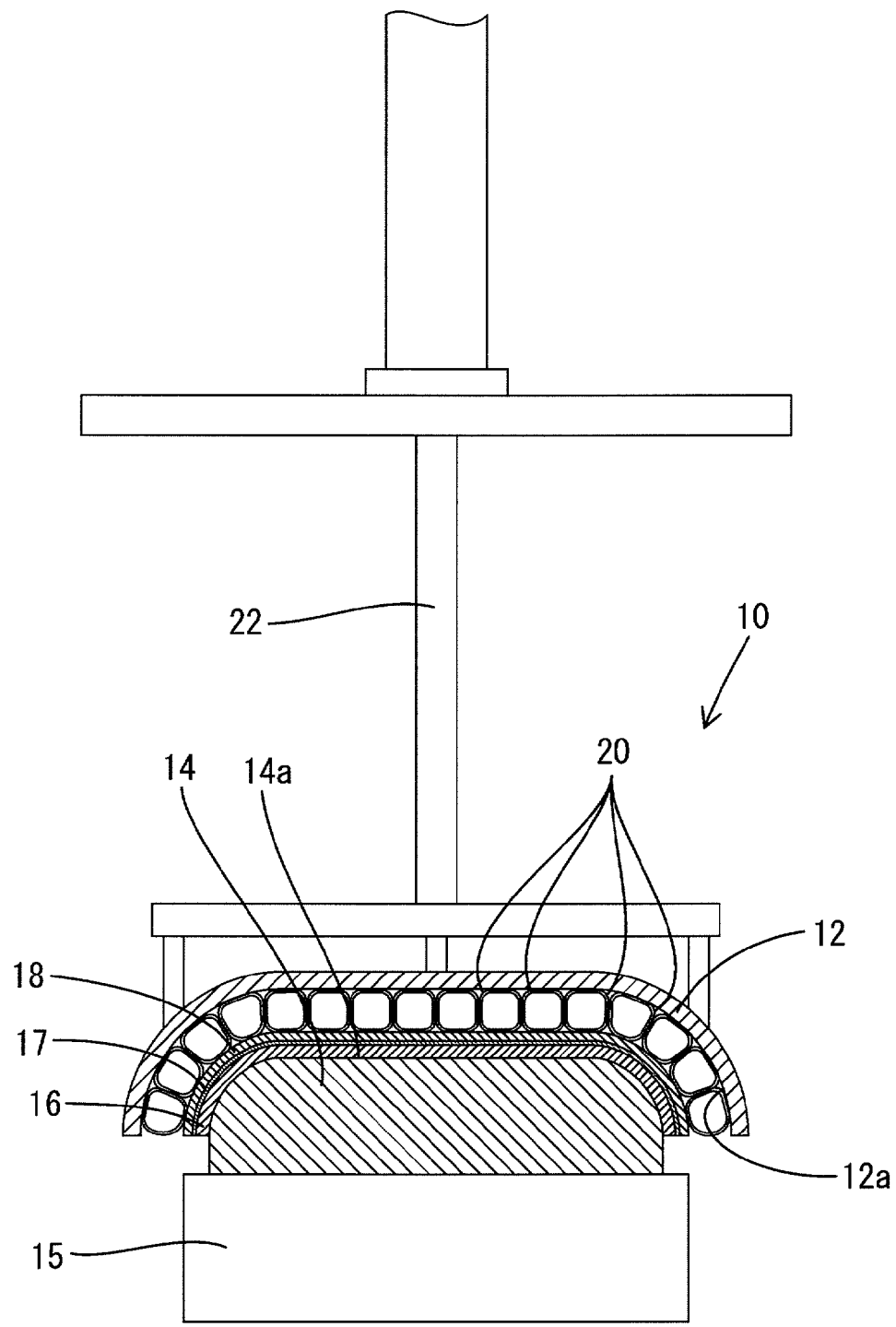
FIG. 4 is across-sectional view of the skin adhesion apparatus, showing another step in the process of adhering the skin to the core material.

FIG. 1 is a perspective view of a skin adhesion apparatus 10 in accordance with the present embodiment. FIGS. 2 through 4 are cross-sectional views of the skin adhesion apparatus 10, successively showing the steps of adhering a skin 18 onto a core material 16.

As shown in FIGS. 1 through 4, the skin adhesion apparatus 10 in accordance with the present embodiment includes an upper mold half 12 and a lower mold half 14. The upper mold half 12 and the lower mold half 14 are arranged to clamp the core material 16 and the skin 18 laid on the core material 16, thereby adhering the skin 18 to a surface of the core material 16.

In the present embodiment, the core material 16 is an instrument panel for a vehicle, and the skin 18 is leather.

The upper mold half 12 is a die having a concave mold surface 12a corresponding to a shape of an upper surface of the core material 16. The upper mold half 12 can be moved up and down by an oil hydraulic cylinder 22. The upper mold half 12 can be also stopped by the oil hydraulic cylinder 22 at any predetermined vertical position during the up-and-down movement.

The lower mold half 14 is a die having an upwardly protruding convex mold surface 14a. The lower mold half 14 is secured to a platen 15.

The skin adhesion apparatus 10 includes a tubular member 20 made of elastic material.

The tubular member 20 is disposed along the mold surface 12a of the upper mold half 12 in a form bent backward at a plurality of portions thereof.

The tubular member 20 is disposed along the mold surface 12a of the upper mold half 12 in rows.

The tubular member 20 is configured, for example, by a tube 35 mm in diameter.

The tubular member 20 is made of elastic material such as rubber (e.g. natural rubber, butadiene rubber, neoprene rubber, silicon rubber, or the like), elastomer, or the like.

The tubular member 20 has proper elasticity and stretching properties. The tubular member 20 is arranged to be inflated by the pressure of the fluid such as water, air, oil, or the like supplied thereinto.

The tubular member 20 is also arranged to maintain the shape inflated by the pressure of the fluid such as water, air, oil or the like supplied therein.

A method for adhering the skin 18 to the core material 16 will be now explained with reference to FIGS. 2 through 4.

First, the core material 16 is set on the lower mold half 14. Specifically, when the core material 16 is placed on the lower mold half 14 and fixed thereon, its position is adjusted so that a concavity profiled in a lower surface thereof mates the mold surface 14a of the lower mold half 14.

Next, adhesive 17 is applied to the upper surface of the core material 16 or to a lower surface of the skin 18.

Next, the skin 18 is placed onto the upper surface of the core material 16, or is positioned in a form stretched at a predetermined distance above the upper surface of the core material 16 with a clamping device (not illustrated) pulling the both ends thereof.

Next, the upper mold half 12 is pulled down and then stopped at a predetermined distance above the core material 16 (as shown in FIG. 3). For example, the upper mold half 12 is stopped at a distance approximately 30 mm above the core material 16.

Finally, fluid is supplied into the tubular member 20 so that the fluid pressure inflates the tubular member. When the tubular member 20 is inflated, the tubular member 20 presses the skin 18 against the core material 16 (as shown in FIG. 4). The pressure of fluid to be supplied into the tubular member 20 in this step may be set, for example, approximately 0.01 MPa. The tubular member 20 is arranged in such a manner that no gap remains between any one of the rows when the tubular member 20 is inflated.

Figure 5:
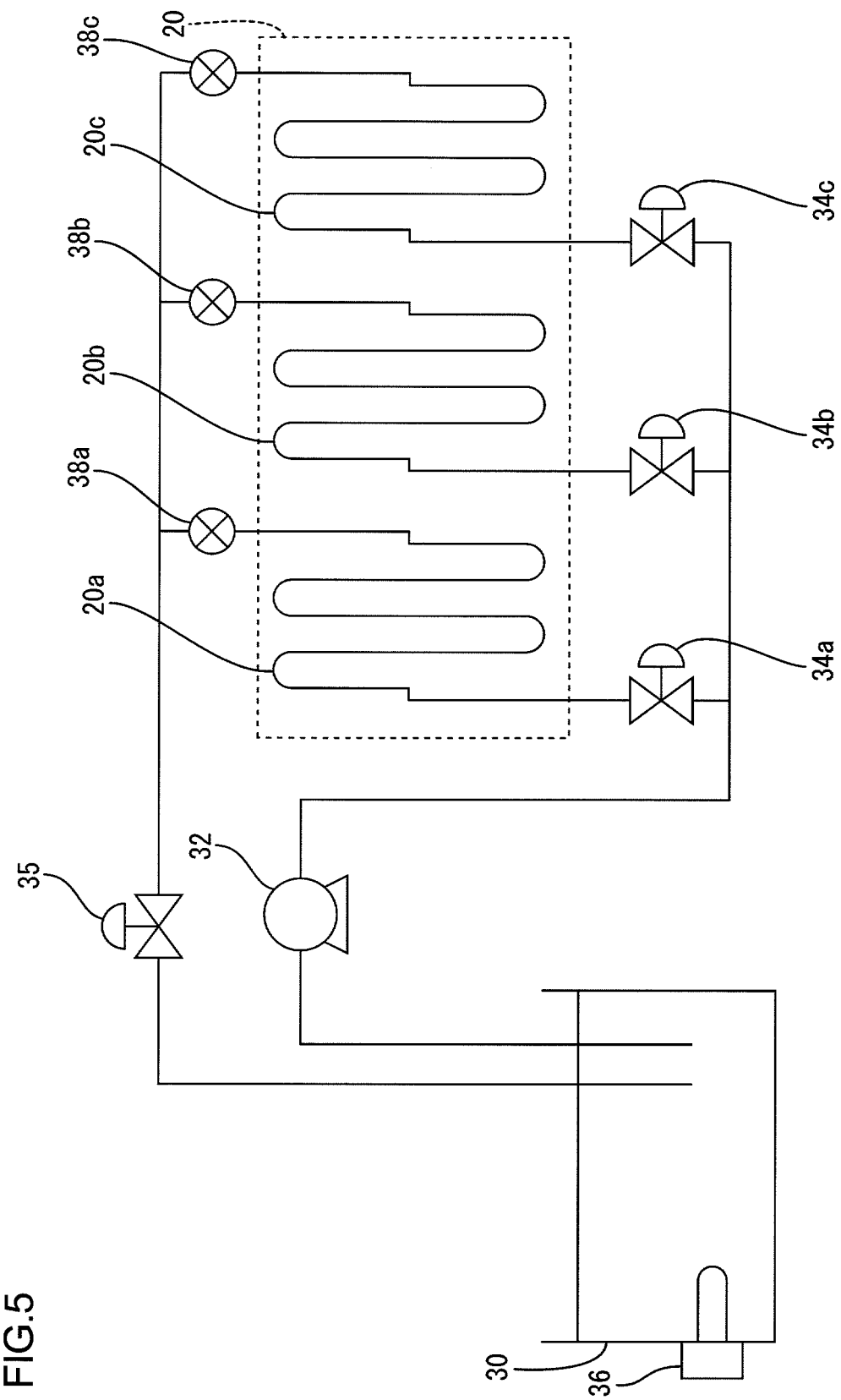
FIG. 5 shows an illustrative structure of a whole system for supplying fluid into a tubular member.
Figure 6:
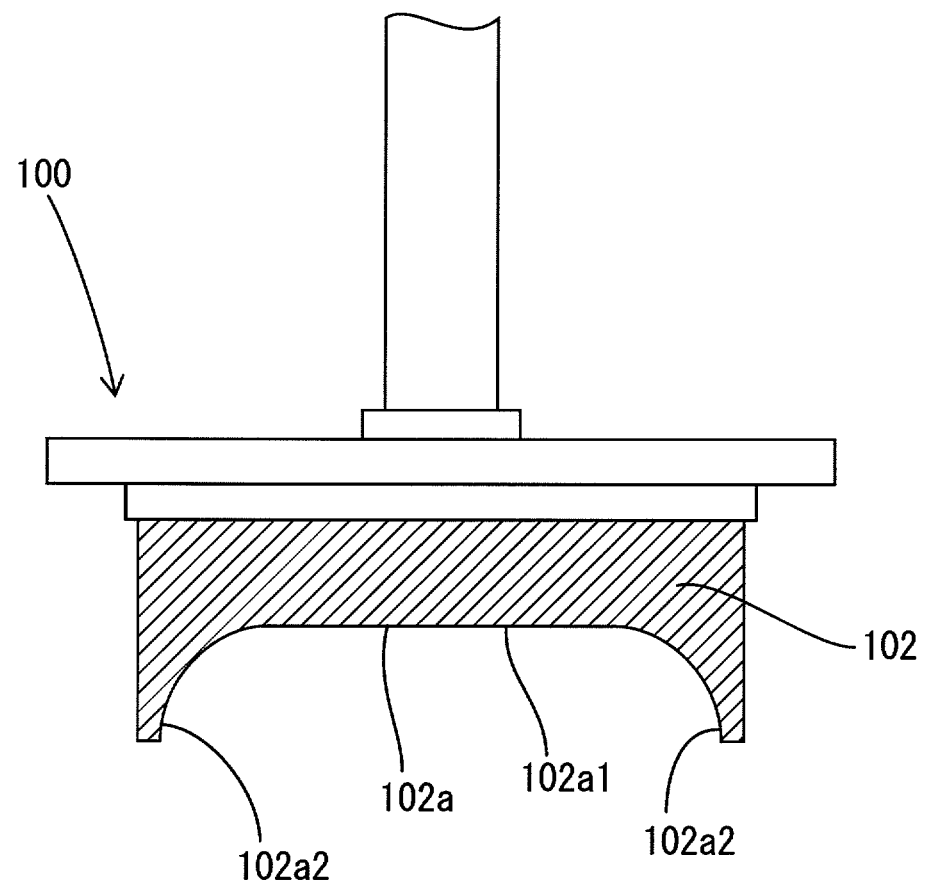
FIG. 6 is a cross-sectional view of a skin adhesion apparatus of a related art.
Figure 6:
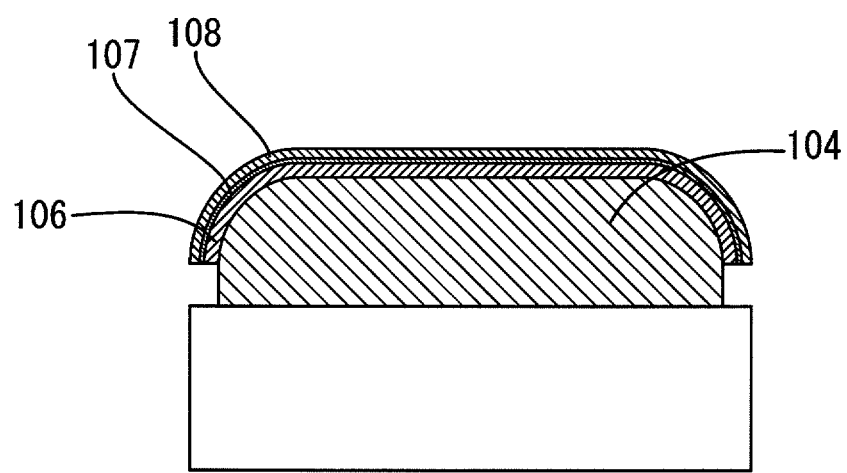

FIG. 5 shows an illustrative structure of a whole system for supplying fluid into the tubular members 20.

As shown in FIG. 5, the tubular member 20 disposed along the mold surface 12a of the upper mold half are configured by three parallel-connected tubular members 20a-20c. All of the three tubular members 20a-20c are joined to a single pipe in the inflow side thereof, while all of the three tubular members 20a-20c are joined to another single pipe in the outflow side thereof. These two pipes are connected to a circulation tank 30. Collected in the circulation tank 30 is water. The water collected in the circulation tank 30 is pumped up by a pump 32 and supplied into each of the three tubular members 20a-20c. The pump 32 corresponds to "a fluid supplier" of the present invention.

Interposed in the inflow side of the three tubular members 20a-20c each is respective pressure-regulating valves 34a-34c. Each of the pressure-regulating valves 34a-34c is arranged to separately control the pressure of the water to be supplied into the respective one of the three tubular members 20a-20c. The pressure-regulating valves 34a-34c correspond to "a pressure controller" of the present invention.

Interposed in the outflow side of the three tubular members 20a-20c is a circulation valve 35. The circulation valve 35 is arranged to, by being opened, allow the supplied water in the three tubular members 20a-20c to return to the circulation tank 30.

Interposed in the outflow side of the three tubular members 20a-20c each are respective pressure sensors 38a-38c. Each of the pressure sensors 38a-38c is arranged to separately measure the pressure of the supplied water in the respective one of the three tubular members 20a-20c.

The circulation tank 30 has a heater 36 installed thereon for heating the water collected in the circulation tank 30. The water to be supplied into the three tubular members 20a-20c can be heated by the heater 36. The heater 36 corresponds to "a temperature controller" of the present invention. Note that a cooler, instead of the heater 36, may be installed on the circulation tank 30. The water to be supplied into the three tubular members 20a-20c is cooled in this case.

According to the configuration as above, the pressures of water to be supplied into the three tubular members 20a-20c are arranged to be controlled each separately.

Furthermore, the three tubular members 20a-20c each may have respective circulation tanks 30 installed thereon. In this case, the temperatures of water to be supplied into each of the three tubular members 20a-20c is arranged to be separately controlled at any expected temperature.

According to the skin adhesion apparatus 10 in accordance with the present embodiment, the skin 18 is pressed against the surface of the core material 16 by the tubular member 20 inflated with fluid supplied therein. Since serious partial downward inflation associated with the film members of the known arts is not caused in the tubular member 20, the entire skin 18 can be pressed substantially simultaneously against the surface of the core material 16. This allows the skin 18 to be evenly adhered to the surface of the core material 16 to make a good appearance.

The tubular member 20 made of elastic material and having proper elasticity can, only by elastically deforming itself, accept any change in the surface shape of the core material 16. Therefore, even in the case where the surface shape of the core material 16 is slightly changed, it is unnecessary to change the shape of the mold surface 12a of the upper mold half 12

The fluid is supplied to the tubular member 20 only after the upper mold half 12 is pulled down and then stopped. Therefore, the weight of the upper mold half 12 is not directly applied on the core material 16 and the skin 18. Also, the compressive stress generated during the downward movement of the upper mold half 12 is not directly applied on the core material 16 and the skin 18. Accordingly, the appearances of the core material 16 and the skin 18 are free from any undesirable influence associated with the downward movement of the upper mold half 12.

The temperature of the water to be supplied into the tubular member 20 is controllable. This allows the core material 16 and the skin 18 to be heated or cooled.

The temperature of the water to be supplied into the tubular member 20 is controllable. This allows the adhesive 17 to be heated. Accordingly, in a case where the adhesive 17 is a hot-melt one, heating the adhesive 17 and pressing the skin 18 to adhere it to the surface of the core material 16 can be simultaneously operated.

The tubular member 20, which is a means for pressing the skin 18, can also serve for heating or cooling the skin 18 and the core material 16. Therefore, any additional means for heating the skin 18 and the core material 16 is unnecessary to be installed. Any additional means for cooling the skin 18 and the core material 16 is likewise unnecessary to be installed. Accordingly, the configuration of the skin adhesion apparatus 10 can be simplified.

The pressure of the fluid (water) to be supplied into the tubular member 20 is controllable. Accordingly, the pressure for pressing the skin 18 can be controlled. This allows for proper control of the fluid pressure in accordance with the shape of the core material 16, the type of the skin 18, the type of the adhesive 17, or the like. As the result, the skin 18 is more reliably adhered to the surface of the core material 16.

For example, it is preferable that the pressure of the fluid to be supplied into the tubular member 20 is controlled to be higher at the portion facing a complexly shaped portion of the core material 16. This allows the shape of the skin 18 to be adapted for the shape of the core material 16, and thereby allowing the skin 18 to be more reliably adhered to the surface of the core material 16.

The tubular member 20 may be configured by a plurality of parallel-connected tubular members 20a-20c. In this case, each of the pressures of the fluid to be supplied into the plurality of tubular members 20a-20c can be separately controlled. This allows for separate control of each of the pressures of the plurality of tube members 20a-20c for pressing the skin.

At the portion where a higher pressure for pressing the skin 18 is expected, it is preferable that the pressure of the fluid to be supplied into the corresponding one of the tubular members 20a-20c is controlled to be higher. At the portion where a lower pressure for pressing the skin 18 is expected, it is preferable that the pressure of fluid to be supplied into the corresponding one of the tubular members 20a-20c is controlled to be lower. This allows the skin 18 to be more reliably adhered to the surface of the core material 16.

The tubular member 20 is disposed in a form bent backward at a plurality of portions thereof along the mold surface 12a of the upper mold half 12. Accordingly, the tubular member 20 can be configured by a single tubular member 20, and therefore the configuration of the whole apparatus can be more simplified.

Note that the tubular member 20 may be configured by a single tubular member 20 bent backward at a plurality of portions thereof, or may be configured by a plurality of series-connected or parallel-connected tubular members 20a-20c.

<Other Embodiments>

With embodiments of the present invention described above with reference to the accompanying drawings, it is to be understood that the invention is not limited to those precise embodiments, and the embodiments as below, for example, can be within the scope of the present invention.

(1) In the above embodiment, the core material 16 is illustratively an instrument panel for a vehicle, however, the type of the core material 16 is not limited to this. The core material 16 may be any other interior parts for a vehicle such as, for example, a door trim, a seat back board, a partition board, a console box, a pillar garnish, a quarter trim, or the like.

(2) In the above embodiment, the skin 18 is illustratively leather, however, the type of the skin 18 is not limited to this. The skin 18 may be, for example, woven fabric, unwoven fabric, knitted fabric, any film or sheet made of thermoplastic resin or thermal plastic elastomer, or the like. Furthermore, any cushion layer made of polyurethane, rubber, thermal plastic elastomer, or the like may be laminated to the skin.

(3) In the above embodiment, the tubular member 20 is illustratively in direct contact with the surface of the skin 18, however, the present invention is not limited to such an illustrative aspect. For example, any protect sheet (e.g. a protect sheet formed by woven fabric) for protecting the skin 18 may be disposed between the tubular member 20 and the skin 18. Such a protect sheet, by being disposed between the skin 18 and the tubular member 20, prevents formation of dents and the like in the surface of the skin 18 associated with the pressure on the surface of the skin 18 applied by the tubular member 20.

What is claimed is:

1. A method for adhering a skin to a surface of a core material, the method comprising:
   a) setting the core material on a lower mold half;
   b) after step a), placing the skin onto an upper surface of the core material, the skin being formed prior to placement on the upper surface of the core material;
   c) pulling down an upper mold half and then stopping the upper mold half at a predetermined distance above an upper surface of the skin;
   d) after step c), selectively supplying fluid into a plurality of parallel-connected tubular members made of elastic material, the plurality of parallel connected tubular members being disposed along a mold surface of the upper mold half;

e) one of inflating the at least one tubular member by a pressure of the fluid or maintaining the shape of the at least one tubular member inflated by the pressure of the fluid; and f) pressing the entire upper surface of the skin against the core material by the plurality of parallel-connected tubular members; and g) individually controlling the pressure of the fluid in each tubular member of the plurality of parallel-connected tubular members in accordance with a shape of the core material such that a pressure of the fluid is higher in tubular members facing complex-shaped portions of the core material than a pressure of the fluid in tubular members facing other portions of the core material to secure adherence of the skin to the core material.

2. The method for adhering the skin according to claim 1, further comprising controlling a temperature of the fluid to be supplied into the plurality of parallel-connected tubular members.

3. The method for adhering the skin according to claim 1, wherein the skin is one of a leather, a woven fabric, an unwoven fabric, a knitted fabric, a thermoplastic resin film, a thermoplastic resin sheet, a film made of a thermal plastic elastomer, and a sheet made of a thermal plastic elastomer.

4. A method of adhering a skin to a surface of a core material, the method comprising:

setting the core material having a curved upper surface on a lower mold half;

after the setting, placing the skin onto a curved upper surface of the core material;

lowering an upper mold half having a curved mold surface and a plurality of parallel-connected tubular members on the curved mold surface, each of tubular members being made of an elastic material, and then stopping the upper mold half at a predetermined distance above an upper surface of the skin;

after the lowering, supplying fluid into at least one of the tubular members;

inflating the at least one tubular member by a pressure of the fluid;

controlling the pressure of the fluid supplied in each of the tubular members separately in accordance with a shape of the core material;

increasing the pressure of the fluid supplied in one of the tubular members corresponding to a complex shaped portion of the core member; and pressing the entire upper surface of the skin against the curved upper surface of the core material by the tubular members with different levels of pressure.

* * * * *